United States Patent
Dimitrova et al.

(10) Patent No.: US 10,961,392 B2
(45) Date of Patent: Mar. 30, 2021

(54) CONDENSATION CURABLE COMPOSITIONS

(71) Applicant: DOW SILICONES CORPORATION, Midland, MI (US)

(72) Inventors: Tatiana Dimitrova, Seneffe (BE); Anne-Marie Van Stiphoudt, Seneffe (BE); Chelsea Quinn, Auburn, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 17/043,256

(22) PCT Filed: Mar. 15, 2019

(86) PCT No.: PCT/US2019/022413
§ 371 (c)(1),
(2) Date: Sep. 29, 2020

(87) PCT Pub. No.: WO2019/190776
PCT Pub. Date: Oct. 3, 2019

(65) Prior Publication Data
US 2021/0054202 A1    Feb. 25, 2021

(30) Foreign Application Priority Data
Mar. 30, 2018 (GB) ...................... 1805382

(51) Int. Cl.
*C08L 83/04* (2006.01)

(52) U.S. Cl.
CPC .................... *C08L 83/04* (2013.01)

(58) Field of Classification Search
None
See application file for complete search history.

(56) References Cited

U.S. PATENT DOCUMENTS

| | | | |
|---|---|---|---|
| 6,063,487 A | 5/2000 | Azechi et al. | |
| 7,501,183 B2 | 3/2009 | Hara et al. | |
| 7,704,607 B2 | 4/2010 | Hara et al. | |
| 2010/0099793 A1 | 4/2010 | Wunder | |
| 2012/0192947 A1 | 8/2012 | Rasal et al. | |
| 2015/0072079 A1* | 3/2015 | Bourbigot | C09D 183/06 427/373 |
| 2015/0353774 A1* | 12/2015 | Simon | C08L 83/00 427/387 |
| 2016/0326415 A1* | 11/2016 | Jadot | C08L 71/02 |
| 2017/0372815 A1 | 12/2017 | Grau et al. | |

FOREIGN PATENT DOCUMENTS

| | | | | |
|---|---|---|---|---|
| CN | 102516927 A | * | 6/2012 | |
| CN | 102516927 A | | 6/2012 | |
| EP | 0802233 B1 | | 2/2004 | |
| EP | 2106418 A1 | | 10/2009 | |
| EP | 0893823 B1 | | 5/2012 | |
| EP | 2489069 A1 | | 8/2012 | |
| EP | 2952544 A1 | | 12/2015 | |
| JP | 4903008 B2 | | 3/2012 | |
| JP | 5776650 B2 | | 9/2015 | |
| WO | 2007037552 A2 | | 4/2007 | |
| WO | 2011047194 A1 | | 4/2011 | |
| WO | 2013150121 A1 | | 10/2013 | |
| WO | WO-2013150121 A1 | * | 10/2013 | ............. C09D 5/185 |
| WO | 2019190775 A1 | | 10/2019 | |

OTHER PUBLICATIONS

International Search Report for PCT/US2019/022413 dated May 29, 2019, 4 pages.
Xuefang Song et al., "Mechanical properties of styrene-butadiene-styrene block copolymer composites filled with calcium carbonate treated by liquid polybutadienes", Journal of Applied Polymer Science, vol. 113, No. 6, Sep. 15, 2009, pp. 3661-3670.
Database WPI, Week 201341, Thomson Scientific, London, GB; AN 2012-K08208, XP002791500.
Machine assisted English translation of CN102516927A obtained from https://patents.google.com/patent on Sep. 28, 2020, 9 pages.
N. J. Mills, "The Rheological Properties and Molecular Weight Distribution of Polydimethlsiloxane", European Polymer Journal, 1969, p. 675-695, vol. 5.
Momentive RTV157 and RTV159 Technical Data Sheet, Sep. 17, 2020, 7 pages.
Machine assisted English translation of JP4903008B2 obtained from https://patents.google.com/patent on Jan. 11, 2021, 12 pages.
Machine assisted English translation of JP5776650B2 obtained from https://patents.google.com/patent on Jan. 11, 2021, 9 pages.

* cited by examiner

*Primary Examiner* — Peter A Salamon
(74) *Attorney, Agent, or Firm* — Warner Norcross + Judd LLP

(57) ABSTRACT

A condensation cure organosiloxane composition is disclosed. The composition may be used as an electrically insulating sealant and/or adhesive. The composition comprises: (a) a polydiorganosiloxane having at least two —OH or hydrolysable groups per molecule; (b) a cross-linker which will cross-link polydiorganosiloxane (a); (c) a filler component comprising calcium carbonate; (d) a filler treating agent comprising one or more carboxylated liquid organic polymers; (e) a condensation curing catalyst; and optionally (f) one or more additives. Upon cure, the composition provides a silicone elastomer having a volume resistivity which is $\geq 2 \times 10^{15}$ $\Omega$·cm.

16 Claims, No Drawings

CONDENSATION CURABLE COMPOSITIONS

CROSS-REFERENCE TO RELATED APPLICATIONS

This application is the National Stage of International Appl. No. PCT/US2019/022413 filed on 15 Mar. 2019, which claims priority to and all advantages of Great Britain Appl. No. 1805382.7 filed on 30 Mar. 2018, the content of which is hereby incorporated by reference.

TECHNICAL FIELD

This disclosure concerns a condensation cure organosiloxane compositions that may be used as an electrically insulating sealants and/or adhesive.

BACKGROUND

Condensation curable organosiloxane compositions, which cure to elastomeric solids, are well known. Typically, such compositions are obtained by mixing a polydiorganosiloxane having reactive terminal groups, e.g. hydroxy groups or hydrolysable groups, with e.g. a silane cross-linking agent which is reactive with the polydiorganosiloxane, for example an acetoxy silane, an oximosilane, an aminosilane or an alkoxysilane in the presence of a suitable catalyst. Such compositions typically contain reinforcing fillers such as silica and/or calcium carbonate to enhance their physical properties.

These compositions can be commercialized as one-part or two-part compositions. The former (one-part compositions) cure in contact with atmospheric moisture. The latter (two-part compositions) are formulated typically in such a way that the catalyst and the cross linkers are kept as a "curing agent" separately, from the polydiorganosiloxane polymer having reactive terminal groups and filler (e.g. $CaCO_3$). For the purposes of the current invention the term "curing agent" shall be used to denote the part containing the catalyst, the cross-linker and optionally other ingredients, but excluding the polydiorganosiloxane having reactive terminal groups.

Sealants, encapsulants and adhesives are increasingly being used to replace mechanical fixtures and the like in a wide variety of situations and applications often allowing for cheaper and faster production processes in the manufacture of articles. Increasingly at least some of the parts of such articles contain electrical circuitry resulting in the need for suitable sealants to adhere and/or seal assembled parts of such articles as well as to function as. Typical examples where it would be beneficial to use an electrically insulating silicone sealant or adhesive include but are not limited to sealants and adhesives in photovoltaic applications where they are required to develop permanent seals and/or adhesion between parts and adjacent materials and/or parts such as glass and plastic substrates. Moreover, the insulative character of the material must be preserved over time, e.g. after extensive weathering. A wide variety of sealant/adhesive compositions have been proposed and silicone-based materials are some of the most favored. Hydrosilylation cured silicone compositions are not generally preferred because they are poor adherents whilst condensation cure systems can be problematic because they are in some instances not sufficiently good insulators.

SUMMARY

The inventors have surprisingly discovered silicone compositions which provide a good balance between their mechanical properties and inherent volume resistivity. "Volume resistivity", (ohm·cm (Ω·cm)) is the measurement of the "bulk" resistivity of a material i.e. it discloses the inherent resistance of a tested specimen regardless of its shape or size. In other words, volume resistivity is the resistance to leakage current through the body of an insulating material. Surface resistivity is the resistance to leakage current along the surface of an insulating material. Hence, the higher the surface resistivity and/or volume resistivity, the lower the leakage current and the less conductive the material.

There is provided a silicone elastomer composition comprising:
a) a polydiorganosiloxane having at least two —OH or hydrolysable groups per molecule
b) a cross-linker which will cross-link polydiorganosiloxane (a);
c) a filler component comprising calcium carbonate;
d) a filler treating agent comprising one or more carboxylated liquid organic polymers,
e) a condensation curing catalyst and optionally
f) one or more additives,
which upon cure provides a silicone elastomer having a volume resistivity which is $\geq 2 \times 10^{15}$ Ohm·cm using the test method described herein.

There is provided a silicone elastomer, obtained by curing a composition comprising:
a) a polydiorganosiloxane having at least two —OH or hydrolysable groups per molecule
b) a cross-linker which will cross-link polydiorganosiloxane (a);
c) a filler component comprising calcium carbonate;
d) a filler treating agent comprising one or more carboxylated liquid organic polymers,
e) a condensation curing catalyst and optionally
f) one or more additives,
said silicone elastomer having a volume resistivity which is $\geq 2 \times 10^{15}$ Ohm·cm using the test method described herein.

DETAILED DESCRIPTION

The polydiorganosiloxane having at least two —OH or hydrolysable groups per molecule (a) may be depicted by the following Formula (1):

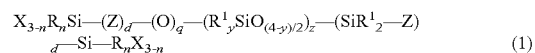

$$X_{3-n}R_nSi-(Z)_d-(O)_q-(R^1_ySiO_{(4-y)/2})_z-(SiR^1_2-Z)_d-Si-R_nX_{3-n} \quad (1)$$

wherein d is 0 or 1, q is 0 or 1 and d+q=1, where n is 0, 1, 2 or 3, z is an integer from 200 to 5000 inclusive, y is 0, 1 or 2, and preferentially 2. At least 97% of the $R^1_ySiO_{(4-y)/2}$ are characterized with y=2. X is a hydroxyl group or alkoxy group or any condensable or any hydrolyzable group, R is individually selected from the group consisting of aliphatic, alkyl, aminoalkyl, polyaminoalkyl, epoxyalkyl, alkenyl or aromatic aryl groups and $R^1$ is individually selected from the group consisting of X, aliphatic alkyl groups, aliphatic alkenyl groups and aromatic groups.

The polydiorganosiloxane (a) may be a single siloxane represented by Formula (1) or it can be mixtures of siloxanes represented by the aforesaid formula or solvent/polymer mixtures. The term "polymer mixture" is meant to include any of these types of polymers or mixtures of polymers.

Each X group may be the same or different and can be a hydroxyl group and any condensable or hydrolyzable group. The term "hydrolyzable group" means any group attached to the silicon which is hydrolyzed by water at room temperature. The hydrolyzable group X includes groups of the Formula —OT, where T is any hydrocarbon or halogenated hydrocarbon group, such as methyl, ethyl, isopropyl, octadecyl, allyl, hexenyl, cyclohexyl, phenyl, benzyl, beta-phenylethyl; any hydrocarbon ether radical, such as 2-methoxyethyl, 2-ethoxyisopropyl, 2-butoxyisobutyl, p-methoxyphenyl or —(CH$_2$CH$_2$O)$_2$CH$_3$; or any N,N-amino radical, such as dimethylamino, diethylamino, ethylmethylamino, diphenylamino or dicyclohexylamino.

The most preferred X groups of the invention are hydroxyl groups or alkoxy groups. Illustrative alkoxy groups are methoxy, ethoxy, propoxy, butoxy, isobutoxy, pentoxy, hexoxy and 2-ethylhexoxy; dialkoxy radicals, such as methoxymethoxy or ethoxymethoxy and alkoxyaryloxy, such as ethoxyphenoxy. The most preferred alkoxy groups are methoxy or ethoxy.

R is individually selected from the group consisting of aliphatic groups, such as alkyl groups, substituted alkyl groups e.g. aminoalkyl, polyaminoalkyl, epoxyalkyl, groups and alkenyl groups and aryl groups. Most preferred are the methyl, ethyl, octyl, vinyl, allyl and phenyl groups.

$R^1$ is individually selected from the group consisting of X, aliphatic alkyl groups, aliphatic alkenyl groups and aromatic groups. Alternatively, $R^1$ groups are selected from methyl, ethyl, octyl, trifluoropropyl, vinyl and phenyl groups. It is possible that some $R^1$ groups may be siloxane branches off the polymer backbone which may have terminal groups as hereinbefore described.

Z is independently a saturated, bi-valent aliphatic radical of the type of $C_wH_{2w}$ where w is 2 or more, alternatively w is from 2 to 10.

Polydiorganosiloxane (a) according to examples of the disclosure may be present in the form of a single polymer, or as a blend of polydiorganosiloxanes (a) having different degrees of values of z in formula (1) above.

The Degree of Polymerization (DP) in a macromolecule or polymer or oligomer molecule of silicone, in this case polydiorganosiloxane (a) is usually defined as the number of repeating monomeric units in a macromolecule or polymer or oligomer molecule of e.g. in this case polydiorganosiloxane (a). Synthetic polymers invariably consist of a mixture of macromolecular species with different degrees of polymerization and therefore of different molecular weights. There are different types of average polymer molecular weight, which can be measured in different experiments. The two most important are the number average molecular weight ($M_n$) and the weight average molecular weight (Mw). The $M_n$ and Mw values of silicone can be determined by Gel permeation chromatography GPC) with precision of about 10-15%. This technique is standard and yields Mw (weight average molecular weight), Mn (number average molecular weight) and the polydispersity index (PI). DP=Mn/Mu where Mn is the number-average molecular weight coming from the GPC measurement and Mu is the molecular weight of a monomer unit. PI=Mw/Mn. The higher the DP, the higher the viscosity.

The mathematical relationship of DP to the viscosity of the polymer via Mw, is understood to be typically: Log (Viscosity)=3.70 log(Mw)−16.3 for Mw values between 13000 and 70000. (Mills, E., European Polymer Journal, 1969, 675-695, see specifically pages 682 and 683, FIG. 4 and equation 14.).

For the avoidance of doubt, polydiorganosiloxane (a) may also be referred to as a siloxane polymer and/or as a silicone polymer. Polydiorganosiloxane (a) may be present in an amount of from 40 to 75% by weight of the composition, alternatively from 40 to 65% by weight of the composition.

Any suitable cross-linker (b) may be used. The cross-linker (b) is one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, iso-butoxy and propoxy) and alkenyloxy groups (for example isopropenyloxy and 1-ethyl-2-methylvinyloxy).

In the case of siloxane based cross-linkers the molecular structure can be straight chained, branched, or cyclic.

The cross-linker preferably has at least three or four hydroxyl and/or hydrolysable groups per molecule which are reactive with the hydroxyl and/or hydrolysable groups in organopolysiloxane (a). When the cross-linker is a silane and when the silane has a total of three silicon-bonded hydroxyl and/or hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic group is methyl.

Silanes and siloxanes which can be used as cross-linkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyltripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

Alternatively, cross-linker (b) may comprise a silyl functional molecule containing two or more silyl groups, each silyl group containing at least one —OH or hydrolysable group, the total of number of —OH groups and/or hydrolysable groups per cross-linker molecule being at least 3. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be a polymeric chain having a siloxane or organic polymeric backbone. In the case of such siloxane or organic based cross-linkers the molecular structure can be straight chained, branched, cyclic or macromolecular.

In the case of siloxane-based polymers the viscosity of the cross-linker will be within the range of from 0.5 mPa·s to 80,000 mPa·s at 25° C., alternatively 0.5 mPa·s to 25,000 mPa·s at 25° C., alternatively 0.5 mPa·s to 10,000 mPa·s at 25° C. measured using a Brookfield viscometer. Examples of disilyl polymeric cross-linkers with a silicone polymer chain bearing alkoxy functional end groups include polydimethylsiloxanes having at least one trialkoxy terminal where the alkoxy group may be a methoxy or ethoxy group. Examples might include hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxy tetrasiloxane.

For example, cross-linker (b) may be a disilyl functional polymer, that is, a polymer containing two silyl groups, each having at least one hydrolysable group such as described by the formula

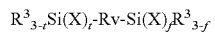

where each $R^3$ may be the same or different and is selected from aliphatic alkyl groups, aliphatic alkenyl groups and aromatic groups, alternatively $R^3$ is an alkyl group having from 1 to 6 carbons; X may be individually selected as hereinbefore described above and t and f are independently an integer of 1, 2 or 3, alternatively 2 or 3. Rv is an alkylene (divalent hydrocarbon radical), alternatively an alkylene group having from 1 to 10 carbon atoms, or further alternatively 1 to 6 carbon atoms or a combination of said divalent hydrocarbon radicals and divalent siloxane radicals. Preferred di-silyl functional polymer cross-linkers have t=2 or 3, X=OMe and Rv being an alkylene group with 4 to 6 carbons.

Examples of disilyl polymeric cross-linkers with an organic polymer chain bearing alkoxy functional end groups include 1, 6-bis(trimethoxy silyl)hexane.

The amount of cross-linker present in the composition will depend upon the nature of the cross-linker and in the molecular weight of the molecule selected.

The compositions suitably contain cross-linker in at least a stoichiometric amount as compared to organopolysiloxane (a) described above, i.e. in respect to reactive groups available with polyorganosiloxane (a). Generally, this means the cross-linker is present in an amount of from 1 to 15% by weight dependent on the type of cross-linker selected; alternatively, from 1 to 10% by weight of the composition.

The filler component (c) comprises calcium carbonate. The calcium carbonate present is a precipitated or ground calcium carbonate, preferably a precipitated calcium carbonate. Filler component (c) is present in an amount of from 20 to 50% by weight of the composition, alternatively 30 to 50% by weight. In one embodiment the calcium carbonate present is a precipitated or ground calcium carbonate which, in each case, preferably has a BET specific surface area of >100 $m^2/g$.

The addition of an "active" or reinforcing filler to improve an elastomer's mechanical properties, such as modulus, tensile strength or elongation at break, is known as reinforcement. The use of reinforcing fillers improves both the strength and stiffness characteristics of a cross-linked elastomer. A filled cross-linked elastomer has significantly higher stiffness than an unfilled cross-linked elastomer with the same degree of deformation. Furthermore, a filled cross-linked elastomer also has a considerably higher strength and deformation to break than an unfilled analogue.

The said fillers are typically treated prior to use or in-situ to render them hydrophobic. In the present instance, the surface treatment of filler component (c) is performed using a carboxylated liquid organic polymer (d), alternatively a carboxylated liquid polyalkadiene such as carboxylated liquid polyisoprene, carboxylated liquid polypropadiene, carboxylated liquid polybutadiene and/or carboxylated liquid polyhexadiene and/or carboxylated liquid polyalkadiene copolymers; alternatively, carboxylated liquid polybutadiene. Carboxylated liquid organic polymer (d) is typically present in an amount of from 0.05 to 3% by weight, alternatively from 0.1 to 2% by weight, alternatively from 0.1 to 1.5% by weight, alternatively from 0.1 to 1% by weight of the composition but must be present in an amount to provide a satisfactory hydrophobic coating on filler (c). Typically, surface modified fillers do not clump, and can be homogeneously incorporated into the composition. This results in improved room temperature mechanical properties of the uncured compositions. The reinforcing filler(s) are preferably ground calcium carbonate and/or precipitated calcium carbonate each of which may be independently treated by one or more carboxylated liquid organic polymers, alternatively a carboxylated liquid polybutadiene. Alternatively, the fillers can be treated in situ if the filler(s) and treating agent are introduced into the composition prior to treatment.

It is commonly considered that materials with high specific surface area and which are highly dispersible in organopolysiloxane polymers will provide better reinforcement. The high specific surface area is usually determined by the nitrogen adsorption method based on Brunauer-Emmett-Teller theory or known in the art as the "BET method" and is typically between 10 and 400 $m^2/g$. The ability of a filler to reinforce (or not) is typically provided on the technical specification by the manufacturer. Alternatively, a simple curable composition might be prepared and the reinforcing quality of the filler can be understood by the determination of its post cure physical properties, e.g. tensile strength, elongation at break [%] and hardness. Details and sample formulations for testing are provided in "Technical Bulletin Fine Particles 63", available from EVONIK. For the purpose of this disclosure non-reinforcing fillers have a BET specific surface area of ≤100 $m^2/g$ and reinforcing fillers have a BET specific surface area of >100 $m^2/g$.

The composition may if deemed appropriate include non-reinforcing fillers which function to adjust the viscosity and processability of the composition in an uncured state, achieve specific colour of the final material etc. A suitable non-reinforcing type silica might be utilised when required.

Condensation catalyst (e) may be any suitable tin based condensation catalyst. Examples include tin triflates, organic tin metal catalysts such as triethyltin tartrate, tin octoate, tin oleate, tin naphthenate, butyltintri-2-ethylhexoate, tin-butyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate, dibutyltin dibenzoate, stannous octoate, dimethyltin dineodecanoate (DMTDN) and dibutyltin dioctoate. The catalyst may be present in the composition in an amount of from 1 to 5% by weight of the composition, as required.

Optionally the composition may include one or more additional polydialkylsiloxanes (f) which may be unreactive with both polydiorganosiloxane (a) and cross-linker (b) and have the general formula:

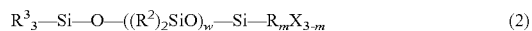

(2)

where R and $R^3$ are as hereinbefore described. Preferably in the case of additional polydialkylsiloxanes (f), R is an alkyl group, typically a methyl group and m=2 or 3. Each $R^3$ may be the same or different and can be the same as hereinbefore described however, preferably each $R^3$ is a methyl group and each $R^2$ group are, for example, methyl, vinyl or phenyl group. Such polydimethylsiloxanes (f) used generally have a viscosity of from about 5 to about 100,000 mPa·s at 25° C., alternatively from about 5 to about 75,000 mPa·s at 25° C., alternatively from about 5 to about 50,000 mPa·s at 25° C. and w is an integer which provides this viscosity range. Typically, polydialkylsiloxane (f) is linear but it may contain a degree of branching. The degree of polymerisation of polydiorganosiloxane (f) may be determined as described above. Typically, when present this polydiorganosiloxane (f) is utilised as a polymer in the curing agent of a two-part composition as described hereafter.

Other additives (g) may include but are not restricted to rheological modifiers; adhesion promoters, pigments, heat stabilizers, flame retardants, UV stabilizers, chain extenders, and fungicides and/or biocides and the like.

Rheology Modifiers

Rheology modifiers which may be incorporated in moisture curable compositions according to the invention include silicone organic co-polymers such as those described in EP0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion of the sealant to substrates, particularly plastic substrates.

Optional additives (g) may also include one or more adhesion promoters such as (i) carbasilatrane derivatives as described in WO2007/037552A2 such as a methoxy group-containing carbasilatrane such as constituent B-2 as described in paragraphs [0026] and [0027] of WO2007/037552A2 and/or adhesion promoter A as described in paragraph [0047] of WO2007/037552A2 incorporated herein by reference; or (ii) an aminoalkylmethoxysilane of the formula

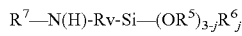

where $R^7$ is H or an amine radical of the type $NH_2$—$C_dH_{2dx}$—; Rv is as hereinbefore described $R^5$ is $C_gH_{2g+1}$, $R^6$ is hydrocarbon which can be unsaturated and has between 1 and 4 carbon atoms inclusive, and j is 0 or 1. Preferably d is between 1 and 6, Rv is $C_eH_{2e}$ with e being between 2 and 7 and g is from 1 to 3, preferably 3. Mixtures of the above adhesion promoters are also included.

In either case, when present the adhesion promoter may be distilled prior to use.

Examples of flame retardants include aluminium trihydrate, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include titanium dioxide, chromium oxide, bismuth vanadium oxide, iron oxides and mixtures thereof.

Examples of heat stabilizers include metal compounds such as red iron oxide, yellow iron oxide, ferric hydroxide, cerium oxide, cerium hydroxide, lanthanum oxide, copper phthocyanine. Aluminum hydroxide, fumed titanium dioxide, iron naphthenate, cerium naphthenate, cerium dimethylpolysilanolate and acetylacetone salts of a metal chosen from copper, zinc, aluminum, iron, cerium, zirconium, titanium and the like. The amount of heat stabilizer present in a composition may range from 0.01 to 1.0% weight of the total composition.

Biocides may additionally be utilized in the composition if required. It is intended that the term "biocides" includes bactericides, fungicides and algicides, and the like. Suitable examples of useful biocides, which may be utilized in compositions as described herein, include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl] methyl]-1H-1,2,4-triazole.

When present in the composition, the fungicide and/or biocide may suitably be present in an amount up to 0.3% by weight of the composition and may be present in an encapsulated form where required such as described in EP2106418.

Dependent on the means of cure (e.g. cross-linker and catalyst) such compositions may be provided to the user in a one-part curable product, which can be applied onto a substrate directly or alternatively in a multi-part, typically two-part, combination requiring the multiple parts to be mixed together immediately before use. The composition as hereinbefore described may comprise a two-part composition comprising a base part and a curing agent.

When the composition is provided in two-parts or more, the properties of Individual parts of said multi-part compositions are generally not affected by atmospheric moisture, but once mixed together the resulting mixture possess excellent deep curability and enables substantially uniform curing throughout the entire body of the sealing material, i.e., from the surface to the inner part. The two-part compositions comprise a first component (base) that contains silanol-terminated diorganopolysiloxane (a), filler (c), i.e. (c) (i) and (c) (ii) and a second component (catalyst or cure package) containing an alkyl-terminated diorganopolysiloxane, tin based catalyst, cross-linker and if required, adhesion promoter as hereinbefore or described or, e.g. a primary aminosilane.

In the case of two-part compositions the base component comprises:

siloxane polymer (a) in an amount of Polydiorganosiloxane (a) may be present in an amount of from 40 to 75% by weight of the composition, alternatively from 40 to 65% by weight of the composition, reinforcing fillers (b) in an amount of from 35% to 55% by weight of the base composition, non-reinforcing fillers (c) in an amount of from 0% to 20% by weight of the base composition, Carboxylated liquid organic polymer (d) in an amount of from 0.05 to 3% by weight, of the base composition, alternatively from 0.1 to 2% by weight of the base composition, alternatively from 0.1 to 1.5% by weight of the base composition, alternatively from 0.1 to 1% by weight of the base composition but must be present in an amount to provide a satisfactory hydrophobic coating with the total weight % of the base component being 100 weight %.

The catalyst package may contain:
one or more polydialkylsiloxanes (f) which may be unreactive with both polydiorganosiloxane (a) and cross-linker (b) and has the general formula:

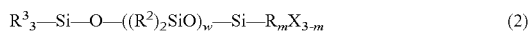
$$R^3{}_3\text{—Si—O—}((R^2)_2\text{SiO})_w\text{—Si—}R_mX_{3-m} \quad (2)$$

where R and $R^3$ are as hereinbefore described and m is 0, 1, 2 or 3. Preferably in the case of additional polydialkylsiloxanes (f), R is an alkyl group, typically a methyl group and m=2 or 3. Each $R^3$ may be the same or different and can be the same as hereinbefore described however, preferably each $R^3$ is a methyl group and each $R^2$ group are, for example, methyl, vinyl or phenyl group, preferably each $R^2$ is a methyl group. Such polydimethylsiloxanes (f) used generally have a viscosity of from about 5 to about 100,000 mPa·s at 25° C., alternatively from about 5 to about 75,000 mPa·s at 25° C., alternatively from about 5 to about 60,000 mPa·s at 25° C. and w is an integer which provides this viscosity range. in an amount of from 0 to 80% by weight of the catalyst package;
with the total weight % of the catalyst package being 100 weight %.

In the case of two-part sealant compositions, the components of each part are mixed together in amounts within the ranges given above and then the base component composition and the catalyst package composition are inter-mixed in a predetermined ratio e.g. from 15:1 to 1:1, alternatively from 14:1 to 5:1 alternatively from 14:1 to 7:1. If the intended mixing ratio of the base component:catalyst package is 15:1 or greater then no filler will be generally utilized in the catalyst package. However, if the intended mixing ratio of the base component:catalyst package is less than 15:1 an increasing amount filler will be utilized in the catalyst package up to the maximum of 50% weight of the catalyst package, if the intended ratio is 1:1. The moisture curable compositions can be prepared by mixing the ingredients employing any suitable mixing equipment.

The two parts of the composition as provided herein may be mixed in any suitable order. In one embodiment the base composition is prepared in the following way:
By mixing the following sequentially
Polydiorganosiloxane (Siloxane polymers) (a);
filler treatment agents (d)
  fillers (c);
And as such treating the reinforcing filler (c) in situ.
In one embodiment the curing agent is prepared by
It was determined that the best order of addition for the curing agent ingredients was as follows: —:
  siloxane polymer(s)
  particulate filler
  Adhesion promoter
Cross-linker and finally
Catalyst.
After addition and mixing the curing agent composition is typically degassed to minimise the likelihood of any unintentional premature cure. The degassing step may be undertaken at any suitable pressure e.g. for the sake of example only at −500 mBar (−50 kPa).

As previously mentioned the compositions as provided herein can be seen to provide a good balance between their mechanical properties and inherent "bulk" volume resistivity, i.e. the inherent resistance of a tested specimen regardless of its shape or size with the higher the surface resistivity and/or volume resistivity, the lower the leakage current and the less conductive the material. As previously discussed the composition herein upon cure provides a silicone elastomer having a volume resistivity which is $\geq 2\times10^{15}$ Ohm·cm; alternatively, is $\geq 5\times10^{15}$ Ohm·cm. Not only does the composition provide such a good volume resistivity but it also is suitable for use as an adhesive.

EXAMPLES

Ingredients Used
Polydiorganosiloxane (a) polymers of different average degrees of polymerisation (DP) were utilised as depicted in the following Tables. They were generally polydimethylsiloxanes having dimethylhydroxy terminal groups unless otherwise indicated. The DPs of the polymers utilised are determined by Gel permeation chromatography (GPC) with precision of about 10-15%. As previously discussed, this technique is standard and yields Mw (weight average molecular weight), Mn (number average molecular weight) and polydispersity index (PI). PI=Mw/Mn values as previously discussed. The DP is linked to the viscosity of the polymer, the higher the DP, the higher the viscosity. Typically, the relationship between viscosity and Mw is Log (Viscosity)=3.70 log (Mw)−16.3 for Mw between 13000 and 70000.

The $CaCO_3$ used in the examples. The mean particle size was 60-70 microns and BET surface area was 18-20 m²/g as per manufacturer's data.

The $CaCO_3$ used in the examples was treated in situ with a carboxylated liquid polybutadiene The adhesion promoter used in this example was a carbasilatrane derivative which was a condensation product of reactive silanes and was made following the description in paragraph [0047] of WO2007/037552A2 (Adhesion promoter A) assigned to Dow Corning. and may be pre-distilled The tin based catalyst used was Dimethyl Tin Di Neodecanoate (DMTDN) or alternatively sealant curing agent containing Sn catalyst the Cross-linker.

The preceding ingredients are henceforth illustrated by the following Examples, in which parts and percentages are by weight, unless otherwise indicated. Brookfield® cone plate viscometer (RV DIII) using cone plate CP-52 for viscosities of 40,000 mPa·s and below and cone plate CP-51 for materials having viscosities greater than 40,000 mPa·s adapting the speed according to the polymer viscosity.

The volume resistivity of a typical calcium carbonate filled two-part sealant formulation was used as a reference. The compositions of the base and curing agent parts are depicted below in Tables 1a and 1b. The base part and curing agent part were mixed together in a ratio of 10:1 was prepared by mixing the Base:curing agent parts in a weight ratio of 10:1 unless otherwise indicated.

TABLE 1a

| INGREDIENTS (BASE) | % by weight |
| --- | --- |
| Mixture of polydimethylsiloxanes having dimethylhydroxy and/or trimethyl terminal groups having a DP of 520 +/− 10% | 52.6 |
| Dimethylhydroxy terminated polydimethylsiloxane DP of 10 +/− 30% | 1.4 |
| Precipitated $CaCO_3$ | 40.0 |
| Ground $CaCO_3$ | 6.0 |

TABLE 1b

| INGREDIENTS (Curing Agent) | % weight |
| --- | --- |
| Trimethoxymethylsilane cross-linker | 4.2 |
| Trimethyl terminated polydimethylsiloxane having a viscosity of 60,000 mPa.s at 25° C. | 56.7 |

TABLE 1b-continued

| INGREDIENTS (Curing Agent) | % weight |
|---|---|
| Carbon black pigment | 13.0 |
| AEROSIL ® R974 treated silica | 0.90 |
| Dimethyl tin dineodecanoate (DMTDN) | 0.2 |
| Adhesion Promoter | 25.0 |

Sample Preparation for Measurement of the Volume Resistivity:

Sheets of 2 mm thickness were prepared in the following manner: The Base and the curing agent were mixed at the appropriate ratio and placed between two teflonized foils. The foils were then pressed against each other using a using a hydraulic press operated at room temperature of 23° C.+/−1° C. The resulting protected sheets obtained were left to cure in controlled conditions (25° C. and 50% relative humidity) for 3 weeks. Then the foils were removed and square pieces of the sheet were cut out of the cure sheets for the volume resistivity measurement.

For the purpose of the invention, the volume resistivity is measure upon the application of 500 V current for 5 minutes. The experiments were conducted at room temperature of 21-23° C. and relative humidity of 50+1-10%. The reported values are average of 3 independent measurements. Volume resistivity was determined using a 16008B Resistivity Cell supplied by Keysight Technologies in combination with a 4339B High Resistance Meter, DC from the same supplier. According to the equipment supplier this equipment is suitable for accurately measuring volume resistance values up to $1.6 \times 10^{16}$ Ohm·cm.

The reference elastomeric material made from the two-part composition depicted in Tables 1a and 1b above gave a value of $1.3 \times 10^{15}$ which is less than $2.0 \times 10^{15}$ as required herein and therefore is not suitable for use in an electronic environment.

Inventive Formulations (Examples)

All compositions are mass parts. Therefore, the sum is not necessarily 100.

TABLE 2a

| | Base 1 | Base 2 |
|---|---|---|
| Dimethyl hydroxyl terminated polydimethylsiloxane DP of 550 +/− 10% | | 53.8 |
| dimethylhydroxy/trimethyl terminated polydimethylsiloxane DP of 550 +/− 10% | 54.11 | |
| Dimethylhydroxy terminated polydimethylsiloxane DP of 10 +/− 10% | 1.45 | 1.45 |
| Precipitated calcium carbonate | 44.44 | 44.45 |
| Carboxylated liquid poly butadiene | | 0.2 |

Preparation of the Base

It was determined that the following proved to be the most efficient order of addition for making the above base material as described:

Polydiorganosiloxane (Siloxane polymers) (a);

filler treatment agents (d)

fillers (c).

The base was generally prepared using a Hauschield mixer model DAC 400.1 FVZ, although alternatively planetary mixers could have been utilised.

TABLE 2b

Curing agent part

| INGREDIENTS | CAT1 | CAT2 | CAT2-repeat |
|---|---|---|---|
| Aminoethyl-aminopropyl-trimethoxy silane (distilled) | 1.9 | 2.4 | 2.4 |
| trimethyl siloxy end-capped polydimethylsiloxane (silicone) DP of 550 +/− 10% | 73.13 | 57.5 | 57.4 |
| AEROSIL ® R974 treated silica | 1.7 | 10 | 10 |
| Dimethyl tin dineodecanoate (DMTDN) | 0.07 | 0.1 | 0.01 |
| Adhesion promoter | 20.1 | 26 | 26 |
| 1,6-bis (trimethoxysilyl)hexane | 3.1 | 4 | 4 |

Preparation of the Curing Agent

Aerosil® R 974 used in the curing agent composition is a hydrophobic fumed silica post-treated with dimethyl-dichloro-silane from Evonik Industries. Specific surface area is 200 m²/g according to technical datasheet.

It was determined that the best order of addition for the curing agent ingredients was as follows: —:

siloxane polymer(s)

particulate filler

Adhesion promoter

Aminoethyl-aminopropyl-trimethoxy silane (distilled)

1,6-bis (trimethoxysilyl) hexane

DMTDN, followed by a degassing at −500 mBar (−50 kPa)

The curing agent was generally prepared using a Hauschield mixer model DAC 400.1 FVZ, although alternatively planetary mixers could have been utilised.

Durable Adhesion:

The viability in practice of an adhesive requires the material to provide durable adhesion. A way to model this is to perform one or more accelerated weathering tests.

An adhesion durability test piece (referred to as a type H test piece (H-bar)) was prepared by packing an admixture prepared by mixing separately stored compositions multi-component room-temperature curable silicone rubber composition between two aluminum 4×5 cm plates. The dimensions of the H-bars were in accordance of EOTA-ETAG 002 (May 2012) document (p 32). Cured specimens were mechanically tested using a tensile traction test. The adhesion durability test pieces were evaluated by measuring both tensile stress necessary to break the piece and elongation at break, following the methodology described in the EOTA-ETAG 002 (May 2012) document. Failure mode was evaluated by visual observation. More specifically, the percentage of the surface that corresponded to cohesive failure (% CF) was assessed. When the entire surface of the silicone rubber was subject to cohesive failure, the CF rate was assumed as 100%. When peeling was carried out over the entire surface, the CF rate was assumed as 0%

Two accelerated ageing tests were performed by (A) storing the cured H-bars under water at 23° C. for seven days, and were then allowed to dry for 24h before performing the mechanical testing;

(B) storing the cured H-bars in oven at 100° C. for 7 days and were then allowed to dry for 24h before performing the mechanical testing For the purpose of the present invention "durable adhesion" was deemed achieved when the tensile stress required to break the H-bars was above 0.7 MPa, the elongation was above 50% and the mode of failure was above 90% CF for all testing conditions.

Total of 9 H-pieces were made for each material; the test specimens were cured for 7 days at 23° C. (RT). and 50% RH.

3 H-bars were tested immediately upon cure; (e.g. after 7 Days RT cure in Table 3)

3 H-bars were stored under water at 23° C. for seven days, and then left to dry for 24 hours and tested; (7D RT cure+7D water 23° C. in Table 3)

3 H-bars were stored in an oven at 100° C. for 7 days, and then left recover for 24h before testing; (7D RT cure+7D oven 100° C. in Table 3).

It was found that all the above examples herein, passed the adhesion test and exhibited volume resistivity higher than 2×10$^{15}$ Ohm·cm. Data is summarized in Table 3.

TABLE 3

Values are averages of 3 independent measurements

| | EX 1 | EX 2 | EX 3 |
|---|---|---|---|
| Curing Agent used | CAT1 | CAT1 | CAT2 |
| Base used | BASE 1 | BASE 2 | BASE 2 |
| VOLUME RESISTIVITY - RT | 3.5 × 10$^{15}$ | 3.9 × 10$^{15}$ | 3.4 × 10$^{15}$ |
| 3 weeks cure | Ohm.cm | Ohm.cm | Ohm.cm |
| Adhesion: 7 Days RT cure | | | |
| (3 H-bars) | | | |
| Break comment | 100% CF | 100% CF | 100% CF |
| tensile strength at break (MPa) | 0.87 | 0.91 | 1.10 |
| Elongation at break % (+/− 10%) | 82.67 | 87.33 | 85.00 |
| Adhesion: 7D RT cure + 7D water | | | |
| 23° C. (3 H-bars) | | | |
| Break comment | 100% CF | 100% CF | 100% CF |
| tensile strength at break (MPa) | 0.98 | 0.87 | 0.91 |
| Elongation at break % (+/− 10%) | 110.00 | 87.50 | 81.75 |
| Adhesion: 7D RT cure + 7D oven | | | |
| 100° C. (3 H-bars) | | | |
| Break comment | 100% CF | 100% CF | 100% CF |
| tensile strength at break (MPa) | 0.88 | 0.85 | 0.98 |
| Elongation at break % (+/− 10%) | 94.67 | 83.00 | 87.67 |

The inventive compositions are characterized upon cure with a volume resistivity above 2×10$^{15}$ Ohm·cm. In the same time, they show excellent adhesion because regardless of the storage process, i) the tensile strength at break was always above 0.7 MPa;

ii) the elongation was always above 50%; and iii) all tested specimens showed 100% cohesive failure.

Base1 and Base 2 were mixed with a replica of CAT2 at mass ratio of 10:1. Sheets of 2 mm thickness were cast as described above and allowed to cure for 9 weeks at RT and relative humidity of +/−50%. The volume resistivity was measured using the aforementioned methodology. Then the sheets were placed in a climatic chamber at 85° C. and 85% relative humidity for 5 hours (h) or 16.5 h. Then the sheets were quickly removed from the climatic chamber and placed in the apparatus for measuring the volume resistivity.

In this specific experimental set a volume resistivity test fixture model 8009 (Tektronix) connected to a 6717A electrometer (Keithley) was used.

The time elapsed between taking the sheet out of the climatic chamber and putting it under tension was precisely controlled and was 48 sec. The reading of the volume resistivity was taken after 5 min at 500V.

The results are summarized in table 4. One notices that even upon storage under high relative humidity conditions, the inventive formulations maintained a high-volume resistivity (i.e. above 2×10$^{15}$ Ohm·cm).

TABLE 4

Volume resistivity

| | Volume resistivity [Ohm.cm] | |
|---|---|---|
| | EX4 BASE 1/ Cat 2-repeat | EX5 BASE 2/ Cat 2-repeat |
| 9 weeks RT +/− 50% relative humidity (RH) | 2.09 × 10$^{16}$ | 3.53 × 10$^{16}$ |
| 9 weeks RT and +/− 50% RH followed by 5 h at 85° C./85% RH | 8.92 × 10$^{15}$ | 8.46 × 10$^{15}$ |
| 9 weeks RT and +/− 50% RH followed by 16.5 h at 85° C./85% RH | 8.53 × 10$^{15}$ | 7.88 × 10$^{15}$ |

What is claimed is:

1. A silicone elastomer composition comprising:
   (a) a polydiorganosiloxane having at least two —OH or hydrolysable groups per molecule;
   (b) a cross-linker which will cross-link polydiorganosiloxane (a);
   (c) a filler component comprising calcium carbonate;
   (d) a filler treating agent comprising a carboxylated liquid organic polymer;
   (e) a condensation curing catalyst; and optionally
   (f) one or more additives;
   which upon cure provides a silicone elastomer having a volume resistivity which is ≥2×10$^{15}$ Ω·cm.

2. The silicone elastomer composition in accordance with claim 1, wherein polydiorganosiloxane (a) is represented by the following general Formula (1):

$$X_{3-n}R_nSi-(Z)_d-(O)_q-(R^1{}_ySiO_{(4-y)/2})_z-(SiR^1{}_2Z)_d-Si-R_nX_{3-n} \quad (1)$$

where each Z is independently a saturated, bi-valent aliphatic radical of the type $C_wH_{2w}$ where subscript w is 2 or more, subscript d is 0 or 1, subscript q is 0 or 1, and d+q=1, and where subscript n is 0, 1, 2 or 3, subscript z is an integer from 200 to 5000 inclusive, subscript y is 0, 1 or 2, each X is a hydroxyl group, an alkoxy group, a condensable group, or a hydrolyzable group, each R is individually selected from the group consisting of aliphatic, alkyl, aminoalkyl, polyaminoalkyl, epoxyalkyl, alkenyl, and aromatic aryl groups, and each $R^1$ is individually selected from the group consisting of X, aliphatic alkyl groups, aliphatic alkenyl groups, and aromatic groups.

3. The silicone elastomer composition in accordance with claim 1, wherein the carboxylated liquid organic polymer is a carboxylated liquid polyalkadiene.

4. The silicone elastomer composition in accordance with claim 3, wherein the carboxylated liquid polyalkadiene is a carboxylated liquid polybutadiene.

5. The silicone elastomer composition in accordance with claim 1, wherein the filler treating agent (d) is present in an amount of from 0.05 to 3% by weight of the composition.

6. The silicone elastomer composition in accordance with claim 1, wherein the composition is stored in at least two-parts prior to use.

7. The silicone elastomer composition in accordance with a claim 6, wherein: a first part is a base composition comprising component (a), component (c), and component (d); and a second part is a curing agent.

8. The silicone elastomer composition in accordance with claim 7, wherein the base composition comprises:
   component (a) in an amount of from 50 to 75% by weight of the base composition;

component (b) in an amount of from 25% to 50% by weight of the base composition;

component (c) in an amount of from 0% to 20% by weight of the base composition; and component (d) in an amount of from 0.05 to 3% by weight of the base composition.

9. A silicone elastomer, obtainable by or obtained by curing the silicone elastomer composition in accordance with claim 1, the silicone elastomer having a volume resistivity which is $\geq 2 \times 10^{15}$ Ω·cm.

10. A method of preparing a silicone elastomer from the silicone elastomer composition in accordance with claim 1, the method comprising curing the silicone elastomer composition.

11. The method in accordance with claim 10, wherein component (c) is treated with component (d) in situ.

12. The method in accordance with claim 10, wherein the composition is stored in at least two-parts prior to use.

13. The silicone elastomer composition in accordance with claim 1, comprising a carboxylated liquid organic polymer as component (d).

14. The silicone elastomer composition in accordance with claim 13, wherein the carboxylated liquid organic polymer comprises a carboxylated liquid polyalkadiene.

15. The silicone elastomer composition in accordance with claim 13, wherein the carboxylated liquid organic polymer is selected from the group consisting of carboxylated liquid polyisoprene, carboxylated liquid polypropadiene, carboxylated liquid polybutadiene, carboxylated liquid polyhexadiene, carboxylated liquid polyalkadiene copolymers, and combinations thereof.

16. A sealant and/or an adhesive comprising or formed from the silicone elastomer in accordance with claim 9.

* * * * *